(12) United States Patent
Klassen et al.

(10) Patent No.: US 6,615,998 B2
(45) Date of Patent: Sep. 9, 2003

(54) FITTINGS FOR MOUNTING ON FRAME MEMBERS OF A SWITCHGEAR CABINET FRAME

(75) Inventors: Samuel Klassen, Haiger (DE); Heiko Holighaus, Eschenburg (DE)

(73) Assignee: Rittal RCS Communication, Haiger (DE)

( * ) Notice: Subject to any disclaimer, the term of this patent is extended or adjusted under 35 U.S.C. 154(b) by 0 days.

(21) Appl. No.: 10/102,563

(22) Filed: Mar. 20, 2002

(65) Prior Publication Data

US 2002/0166831 A1 Nov. 14, 2002

(30) Foreign Application Priority Data

Mar. 21, 2001 (DE) .......................... 101 13 924

(51) Int. Cl.[7] .................................................. A47F 5/00
(52) U.S. Cl. ..................... 211/183; 211/26; 211/189; 312/265.1; 312/265.4
(58) Field of Search .................. 211/26, 189, 182, 211/183; 312/265.1, 265.2, 265.3, 265.4, 265.5, 265.6

(56) References Cited

U.S. PATENT DOCUMENTS

| | | | | |
|---|---|---|---|---|
| 4,643,319 A | * | 2/1987 | Debus et al. | 211/182 X |
| 6,123,400 A | * | 9/2000 | Nicolai et al. | 211/189 X |
| 6,206,494 B1 | * | 3/2001 | Benner et al. | 211/26 X |
| 6,217,138 B1 | * | 4/2001 | Benner et al. | 312/265.4 |
| 6,238,027 B1 | * | 5/2001 | Kohler et al. | 312/265.1 |
| 6,428,127 B1 | * | 8/2002 | Rasmussen | 312/265.4 |

FOREIGN PATENT DOCUMENTS

EP      533 555      3/1993

* cited by examiner

Primary Examiner—Robert W. Gibson, Jr.
(74) Attorney, Agent, or Firm—Pauley Petersen Kinne & Erickson

(57) ABSTRACT

Fittings for mounting on frame members of a switchgear cabinet framework, the frame members having a free space towards the outside corner edge of the framework, which free space forms a receiver, which is closed towards the interior of the framework, is open towards the outside corner edge and is mirror-inverted relative to the diagonal of the frame member. The fittings have a mounting plate the cross-section of which is adapted to the cross-section of the receiver and which plate is connectable to the end profile side of the frame member. The mounting plate preferably has a central mounting bore. The mounting plate, in the longitudinal direction of the frame member, has a predetermined width, which is preferably symmetrical to the mounting bore. At least one side of the mounting plate, which extends transversely relative to the longitudinal direction of the frame member, has at least one connecting projection and one complementary connecting receiver symmetrically relative to the longitudinal axis through the mounting bore at the same spacing.

18 Claims, 4 Drawing Sheets

FITTINGS FOR MOUNTING ON FRAME MEMBERS OF A SWITCHGEAR CABINET FRAME

BACKGROUND OF THE INVENTION

1. Field of the Invention

This invention relates to fittings for mounting on frame members of a switchgear cabinet framework, the frame members having a free space towards an outside corner edge of the framework, which free space forms a receiver closed towards the interior of the framework, and is open towards the outside edge corner and is mirror-inverted relative to the diagonal of the frame member.

2. Description of Prior Art

As European Patent Reference EP 0 533 555 B1 shows, there are various fittings to hinge a cabinet door to the framework and to retain it closed in the closed position. In addition, wall members have to be mounted on the framework through the intermediary of fittings. Special fittings are also necessary to interlock separate frameworks in a fixed manner. In a known switchgear cabinet, the mounting point for the fitting to be attached is fixed with a special mounting member. The mounting member is screw-connected to the end profile side of the receiver of the frame member. The side walls of the mounting members, which are perpendicular to the end profile side, have mounting receivers, into which the mounting projections of the fittings are insertable.

This type of mounting for the fittings requires one mounting member per mounting point, and in addition the strength of the plug connection relative to the fitting is in many cases insufficient.

SUMMARY OF THE INVENTION

It is one object of this invention to configure fittings of the known type but in such a manner that they can be mounted in a non-rotatable manner on the frame members of the switchgear cabinet framework with one single securing screw, it being possible to arrange different fittings together in rows.

The object is achieved according to this invention with fittings that have a mounting plate, the cross-section of which is adapted to the cross-section of the receiver and which plate is connectable to the end profile side of the frame member, the mounting plate preferably having a central mounting bore. The mounting plate in the longitudinal direction of the frame member has a pre-determined width, which is preferably symmetrical to the mounting bore. At least one side of the mounting plate, extending transversely to the longitudinal direction of the frame member, has at least one connecting receiver symmetrically relative to the longitudinal axis through the mounting bore at the same spacing.

In this embodiment, each fitting has a uniform mounting plate, which makes one mounting member per mounting point superfluous. One securing screw is sufficient for the non-rotatable fixing, as the mounting plate is held in the receiver of the frame member through its cross-section. The two-way interlinking through the connecting projections and the connecting receivers improves the locking grip substantially, as the two mounting plates work as one and are fixed so as to be absolutely non-rotatable with two securing screws, even if the mounting plates are seated individually with play in the receiver.

If the two sides of the mounting plate, which extend transversely relative to the longitudinal axis of the frame member, have at least one connecting projection and one connecting receiver inverted on the two sides of the mounting plate, fittings arranged next to each other can be mounted on the frame member pointing in the same direction or in different directions.

The connecting projections and the connecting receivers can be configured in various ways. Thus, one development provides that the connecting projections and the connecting receivers are configured tongue-shaped with a circular-shaped cross-section. The connection can also be such that the connecting projections are configured as teeth and the connecting receivers configured as gaps of teeth, or so that the connecting projections are configured as lugs and the connecting receivers are configured as receiving grooves.

In another embodiment, the connecting projections are configured as dovetails and the connecting receivers are configured as dovetailed grooves.

In one connection, with alternating connecting members, the mounting plate, at the same spacing from the longitudinal axis, has through-bores into which insert pins are selectively insertable.

Flexible displacement of the mounting points is achieved according to a further embodiment because the end profile side of the receiver of the frame member has a central row of mounting receivers in a uniform distribution in the longitudinal direction and the width of the mounting plate corresponds to an integer multiple of this distribution.

If the actual operating parts of the fittings are integrally formed on a parallel side on the mounting plate, which is parallel to the longitudinal axis of the frame member and these operating parts are supported at least partially on the profile side abutting the end profile side, the fittings are additionally supported in the receiver.

The fittings can be configured as hinged members for a cabinet door, as row-arranging members for arranging frameworks in rows, as wall members and as closure members of a lock.

BRIEF DESCRIPTION OF THE DRAWINGS

This invention is described in view of the drawings, wherein.

DESCRIPTION OF PREFERRED EMBODIMENTS

Figure 1:
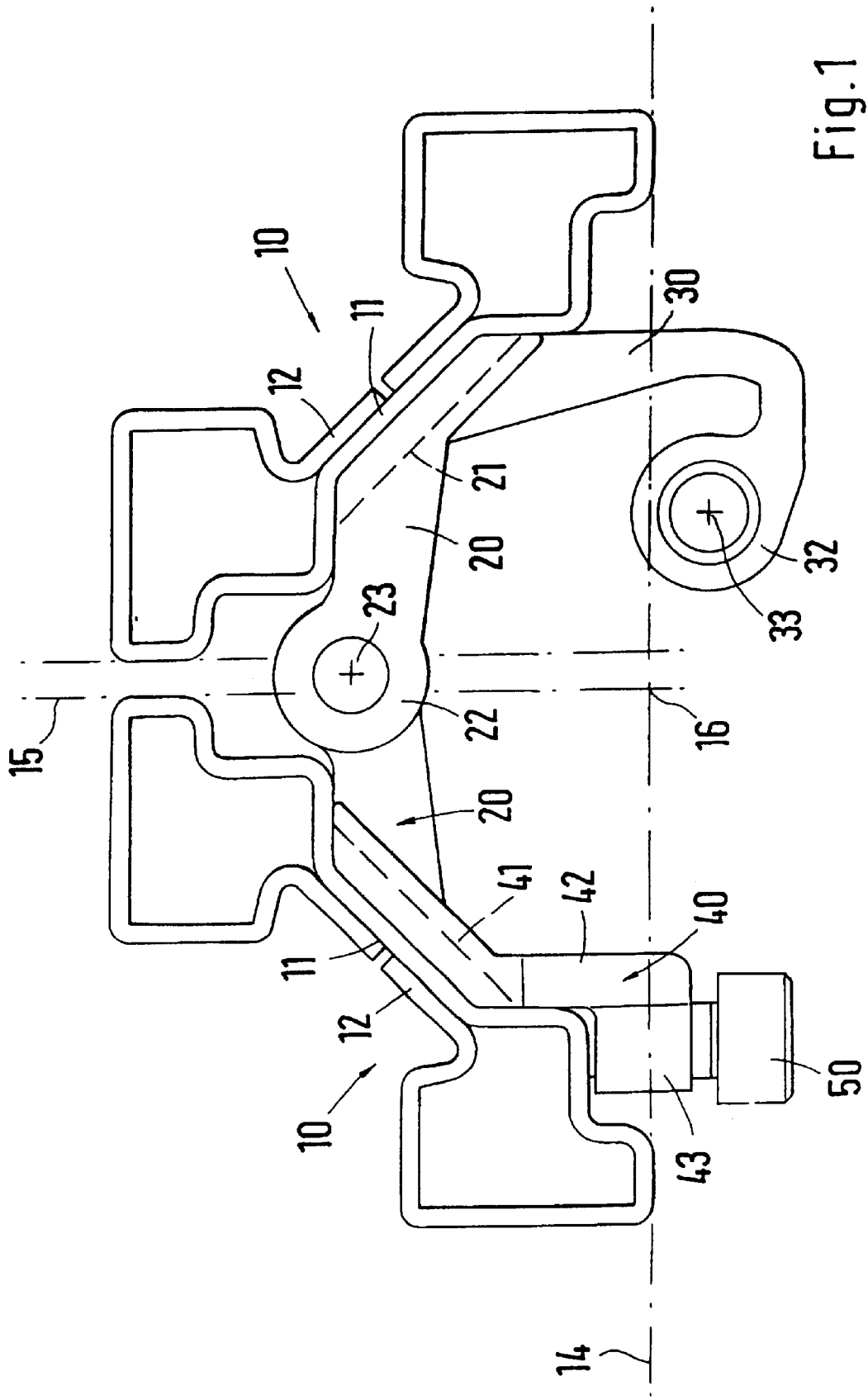
FIG. 1 is a plan of the connecting point between two frameworks arranged in a row with two-arranging members, one hinged member and one wall mounting member.
Figure 2:
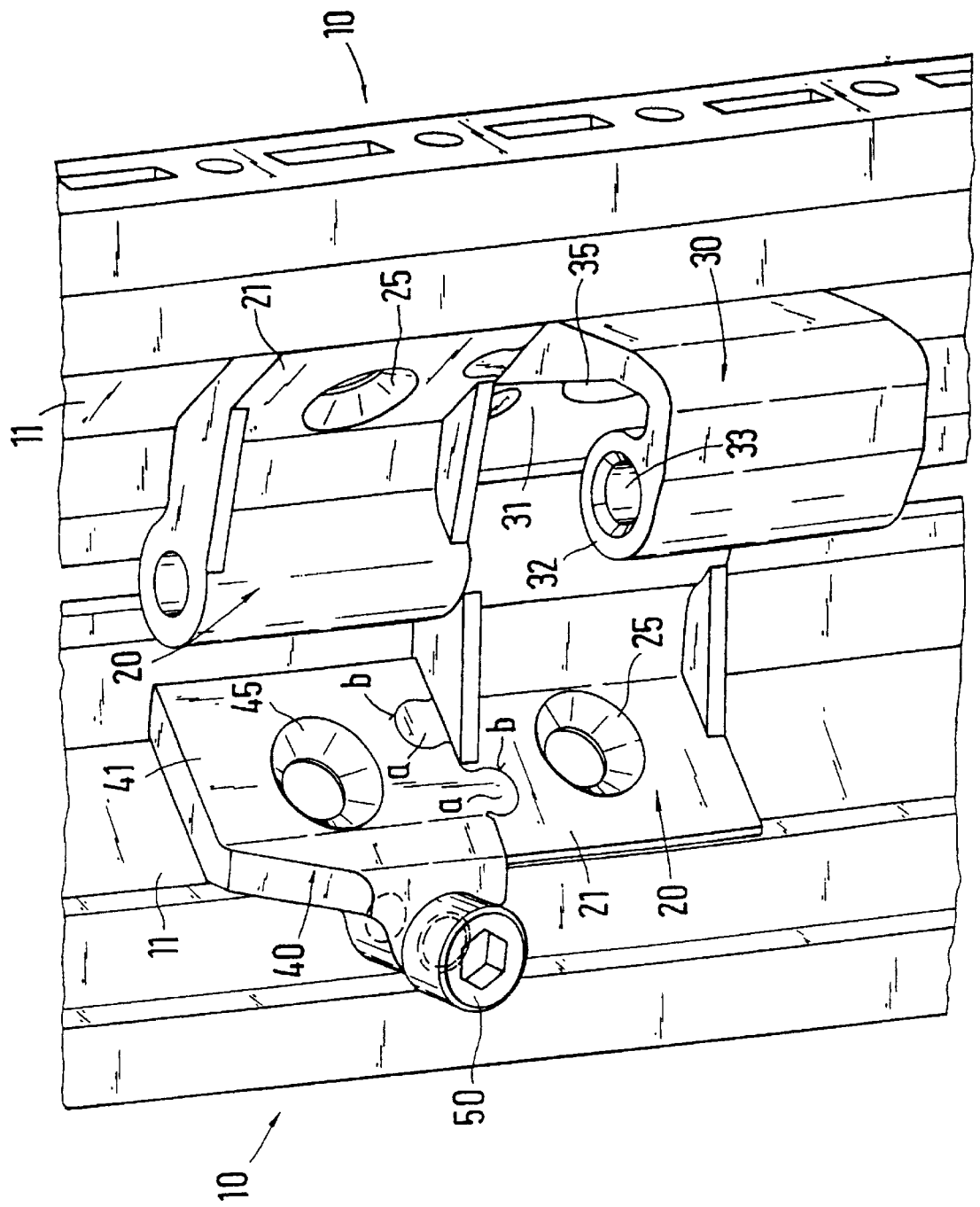
FIG. 2 is a perspective view of the connecting point shown in FIG. 1.

FIGS. 1 and 2 show a connecting point between two frameworks 10 arranged in a row together, the outer planes of the frameworks 10 being represented by the dot-dash lines 14 and 15, which intersect each other at the virtual outside edge corner 16. Towards the assigned outside edge corner 16, the frame members 10 form a free space, which is defined by the end profile side 11 and the connecting profile parts and forms a receiver, which extends to the outside corner edge 16. The end portions 12 of the edged frame member 10 rest on the end profile side 11. Two row-arranging members 20, one hinged member 30 and one wall or closure member 40 are mounted at this position of the two frame members 10. Each of these fittings has a uniform mounting plate 21, 31 or 41 with a central mounting bore 25, 35 or 45, so that only one securing screw is required, respectively, for attachment to the assigned frame member 10.

A row-arranging member 20 is mounted at the top of the right-hand frame member 10, which row-arranging member projects with a connecting sleeve 22 into the free space of the two parallel frame members 10, such that the bore axis 23 of the connecting sleeve 22 lies in the center between the two outer planes 15 of the frame member 10. Another row-arranging member 20 is attached to the left-hand frame member 10, which row-arranging member with the connecting sleeve 22 extends the connecting sleeve 22 of the right-hand row-arranging member 20. The bore accept a connecting bolt so that the two frame members 10 are fixedly interconnected.

Figure 3:
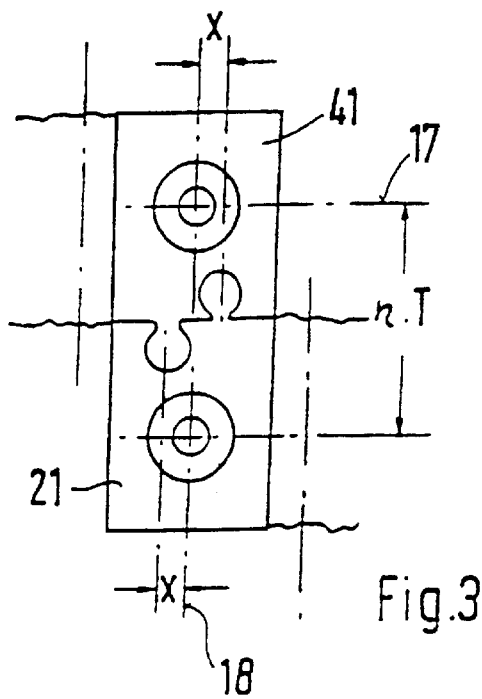
FIG. 3 is a view of two interconnected mounting plates for fittings pointing in different directions.

As shown in FIG. 3, a tongue-shaped connecting projection (a) and a tongue-shaped connecting receiver (b) are provided on one side of the mounting plate 21 symmetrically to a longitudinal axis 18 through the mounting bore 25, both the connecting projection (a) and the connecting receiver (b) having the same circular-shaped cross-section. The longitudinal axis 18 extends parallel to the longitudinal direction of the frame member 10 and the central axes of the connecting projection (a) and the connecting receiver (b) have the same spacing x from the longitudinal axis 18, which extends through the mounting bore 25, as shown in FIG. 3. In this way, two mounting plates, for example, 21 and 41 of a row-arranging member 20 and of a wall member or closure member 40, can be directly mounted on an end profile portion 11 of one single frame member 10 so as to close together, the connecting projections (a) and the connecting receivers (b) fitting into each other.

If the mounting plate 21, 31 and 41 of all fittings 20, 30 and 40 is the same width and if it is symmetrical transversely relative to the longitudinal direction of the frame member 10, the spacing between the mounting bores 45 and 25 can then be brought to an integer multiple η of a pre-determined distribution T, which is based on the distribution T of a row of mounting receivers in the end profile side 11.

Figure 4:
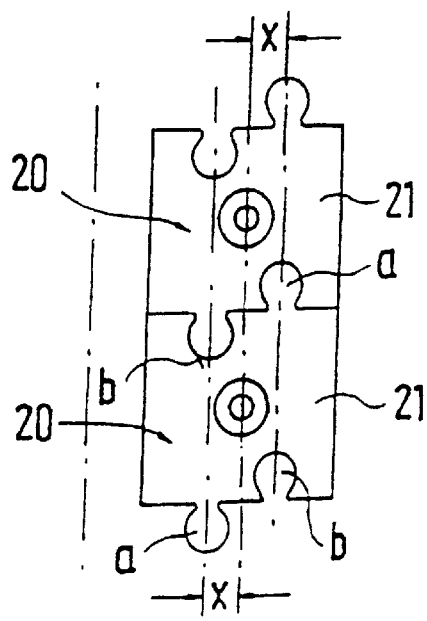
FIG. 4 is a view of two interconnected mounting plates for fittings pointing in the same direction.

As shown in FIG. 4, the two parallel sides of the mounting plate 21 can each have a connecting projection (a) and a connecting receiver (b), disposed on the two sides in an inverted manner. Consequently, the fittings 20 can be mounted on a frame member 10 both in the same direction and in opposite directions.

Figure 6:
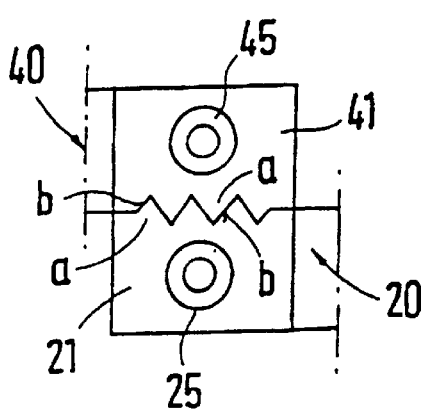
FIG. 6 is a view of two mounting plates, which are connectable through intermediary of toothing.
Figure 7:
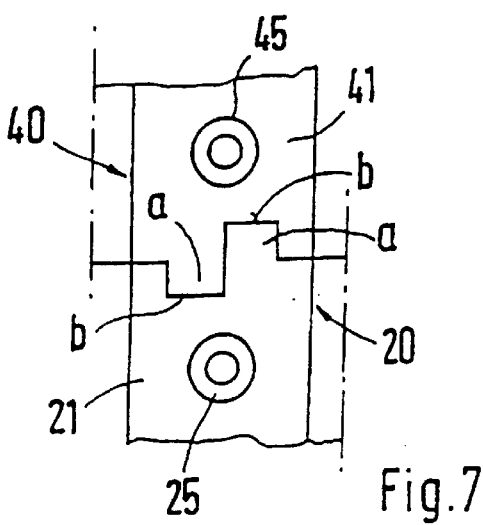
FIG. 7 is a view of two mounting plates, which are connectable through the intermediary of lugs and receiving grooves.

As shown in FIGS. 6 and 7 on mounting plates 21 and 41 of fittings 20 and 40, the connecting projections (a) and the connecting receivers (b) can be configured as teeth and tooth gaps of teeth or as lugs and receiving grooves. At the same time, similar to FIG. 4, the two sides of the mounting plates 21 and 41 can have this type of coupling member.

Figure 5:
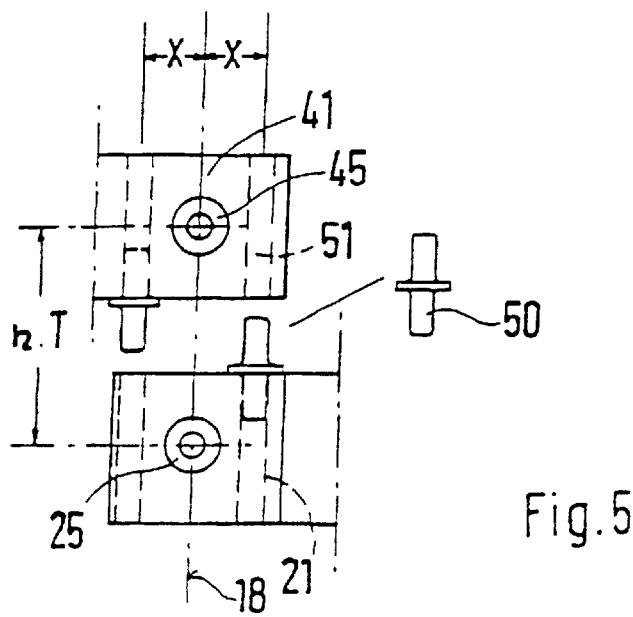
FIG. 5 is a view of two mounting plates, which are connectable through the intermediary of plug connections.

In the case of the mounting plates 21 and 41 in FIG. 5, through-bores 51 are provided as connecting receivers (b), on both sides of the axis 18. The connecting projections (a) are connecting bolts 50, which can be inserted in an arbitrary manner from the one or other side of the mounting plate to be added, to achieve a unidirectional or oppositely oriented arrangement for the fittings 20 and 40, which are arranged together in rows.

Figure 9:
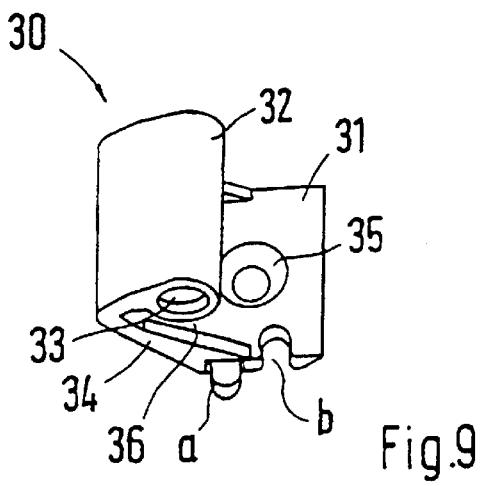
FIG. 9 is a perspective view of a hinged member.

Below the right-hand row-arranging member 20 there is a hinged member 30, which protrudes out of the free area and runs into a hinged eye 32 for a hinge pin lying in front of outer plane 14, such as shown in FIGS. 1,2 and 9. In this case, the hinged eye 32 with the bore 33 is integrally formed on the mounting plate 31 via the transition portion 36 and the lateral reinforcing sections 34.

Figure 10:
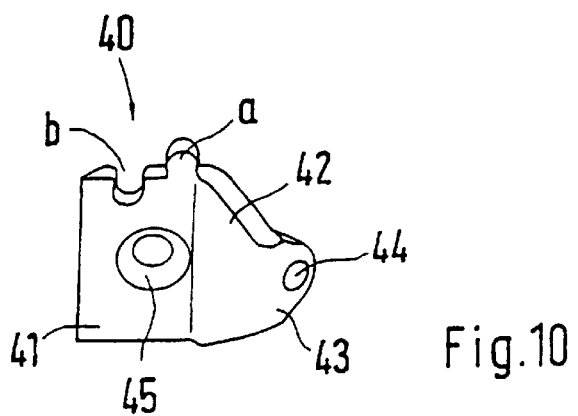
FIG. 10 is a perspective view of a wall mounting member.

A wall member or closure member 40 is mounted on the left-hand frame member 10 via the left-hand row-arranging member 20. In this case, the two-way coupling can be executed in any of the manners shown. A receiver 43 is locked to the mounting plate 41 via a transition portion 42, which receiver can be connected to a closing head 50 or can be configured, as a mounting receiver for the fixing means of a wall member, as shown in FIG. 10.

Figure 8:
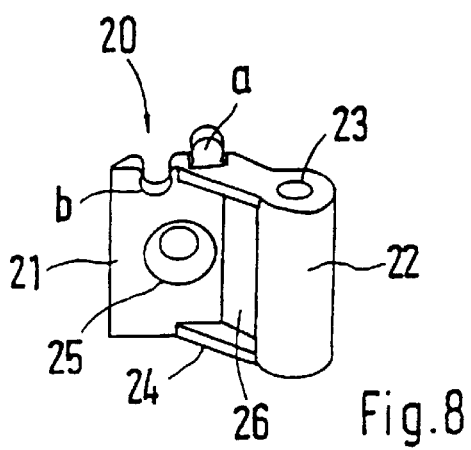
FIG. 8 is a perspective view of a row-arranging member.

The row-arranging member 20 shown in FIG. 8 is also formed in one piece, the transition portion 26 and the stiffening bars 24 connecting the connecting sleeve 22 to the mounting plate 21.

All fitting for the switchgear cabinet have an identical mounting plate, the two sides, extending transversely relative to the longitudinal direction of the frame member 10, each having a connecting projection (a) and a connecting receiver (b) for universal application. More connecting projections and connecting receivers can also be provided on the two sides of the mounting plate, inserted relative to the longitudinal axis 18. Numerous structural solutions are conceivable in the development of the connecting projections and the connecting receivers without departing from the fundamental concept of this invention.

German Patent Reference 101 13 924.1-23, the priority document corresponding to this invention, and its teachings are incorporated, by reference, into this specification.

We claim:

1. In fittings for mounting on frame members of a switchgear cabinet framework, the frame members having a free space towards an outside corner edge of the framework, the free space forming a receiver which is closed towards the interior of the framework, is open towards the outside corner edge and is mirror-inverted about a diagonal of one of the frame members, the improvement comprising:

a plurality of fittings (20, 30, 40) each having a mounting plate (21, 31, 41) with a first cross-section adapted to a second cross-section of the receiver, the mounting plate connectable to an end profile side (11) of the frame member (10), the mounting plate (21, 31, 41) having a central mounting bore (25, 35, 45), the mounting plate (21, 31, 41) in a longitudinal direction of the frame member (10) having a pre-determined width which is symmetrical to the mounting bore (25, 35, 45), at least one side of the mounting plate (21, 31, 41) which extends transversely relative to the longitudinal direction of the frame member (10) having at least one connecting projection (a) and a complementary connecting receiver (b) symmetrically relative to a longitudinal axis through the mounting bore (25, 35, 45) and at a same spacing (x) from the longitudinal axis.

2. In the fittings according to claim 1, wherein two sides of the mounting plate (21, 31, 41) which extend transversely relative to the longitudinal axis of the frame member (10)

have the at least one connecting projection (a) and the connecting receiver (b) at positions which are inverted with respect to each other on the two sides of the mounting plate (21, 31, 41).

3. In the fittings according to claim 2, wherein the at least one connecting projection (a) and the connecting receiver (b) are configured tongue-shaped with a circular-shaped cross-section.

4. In the fittings according to claim 2, wherein the at least one connecting projection (a) is configured as teeth and the connecting receiver (b) is configured as tooth gaps of the teeth.

5. In the fittings according to claim 2, wherein the at least one connecting projection (a) is configured as lugs and the connecting receiver (b) is configured as receiving grooves.

6. In the fittings according to claim 2, wherein the at least one connecting projection (a) is configured as a dovetail and the connecting receiver (b) is configured as a dovetailed groove.

7. In the fittings according to claim 2, wherein the mounting plate (21, 31, 41) at the same spacing from the longitudinal axis has through-bores (51) into which insert pins (50) are selectively insertable.

8. In the fittings according to claim 7, wherein the end profile side (11) of the receiver of the frame member (10) has a central row of mounting receivers in a uniform distribution (T) in the longitudinal direction and the width of the mounting plate (21, 31, 41) corresponds to an integer multiple (η,T) of the distribution (T).

9. In the fittings according to claim 8, wherein actual operating parts of the fittings (20, 30, 40) are integrally formed on a parallel side of the mounting plate (21, 31, 41) which is parallel to the longitudinal axis of the frame member (10), and the operating parts are supported at least partially on a profile side abutting the end profile side (11).

10. In the fittings according to claim 9, wherein the fittings are configured as one of a hinged member (30) for a cabinet door, a row-arranging member (20) for arranging in the frame member (10), a wall mounting member (40) and as a closure member of a lock.

11. In the fittings according to claim 1, wherein the at least one connecting projection (a) and the connecting receiver (b) are configured tongue-shaped with a circular-shaped cross-section.

12. In the fittings according to claim 1, wherein the at least one connecting projection (a) is configured as teeth and the connecting receiver (b) is configured as tooth gaps of the teeth.

13. In the fittings according to claim 1, wherein the at least one connecting projection (a) is configured as lugs and the connecting receiver (b) is configured as receiving grooves.

14. In the fittings according to claim 1, wherein the at least one connecting projection (a) is configured as a dovetail and the connecting receiver (b) is configured as a dovetailed groove.

15. In the fittings according to claim 1, wherein the mounting plate (21, 31, 41) at the same spacing from the longitudinal axis has through-bores (51) into which insert pins (50) are selectively insertable.

16. In the fittings according to claim 1, wherein the end profile side (11) of the receiver of the frame member (10) has a central row of mounting receivers in a uniform distribution (T) in the longitudinal direction and a width of the mounting plate (21, 31, 41) corresponds to an integer multiple (η,T) of the distribution (T).

17. In the fittings according to claim 1, wherein actual operating parts of the fittings (20, 30, 40) are integrally formed on a parallel side of the mounting plate (21, 31, 41) which is parallel to the longitudinal axis of the frame member (10), and the operating parts are supported at least partially on a profile side abutting the end profile side (11).

18. In the fittings according to claim 1, wherein the fittings are configured as one of a hinged member (30) for a cabinet door, a row-arranging member (20) for arranging in the frame member (10), a wall mounting member (40) and as a closure member of a lock.

* * * * *